United States Patent [19]

Dishong et al.

[11] Patent Number: 5,157,088
[45] Date of Patent: Oct. 20, 1992

[54] NITROGEN-CONTAINING ESTERS OF CARBOXY-CONTAINING INTERPOLYMERS

[76] Inventors: Dennis M. Dishong, 3835 Merrymound Rd., South Euclid, Ohio 44121; Richard M. Lange, 155 E. 207th St., Euclid, Ohio 44123

[21] Appl. No.: 579,216

[22] Filed: Sep. 5, 1990

Related U.S. Application Data

[63] Continuation of Ser. No. 187,719, Apr. 29, 1988, abandoned, which is a continuation-in-part of Ser. No. 122,962, Nov. 19, 1987, abandoned.

[51] Int. Cl.⁵ .................. C08F 8/30; C10M 149/06
[52] U.S. Cl. .................. 525/327.6; 525/327.7; 525/333.3; 525/333.6; 525/379; 525/382; 525/384; 252/51.5 A
[58] Field of Search ............ 525/327.6, 327.7, 379, 525/382, 384; 252/51.5 A

[56] References Cited

U.S. PATENT DOCUMENTS

| | | | |
|---|---|---|---|
| 3,085,994 | 4/1963 | Muskat | 526/272 |
| 3,329,658 | 7/1967 | Fields | 525/327.6 |
| 3,363,029 | 1/1968 | Verdol et al. | 525/379 |
| 3,388,106 | 6/1968 | Muskat | 525/327.7 |
| 3,392,155 | 7/1968 | Muskat | 525/327.7 |
| 3,432,479 | 3/1969 | Verdol et al. | 525/379 |
| 3,449,250 | 6/1969 | Fields | 252/51.5 A |
| 3,684,777 | 8/1972 | Field et al. | 525/379 |
| 3,702,300 | 11/1972 | Coleman | 252/51.5 A |
| 3,933,761 | 8/1972 | Coleman | 252/51.5 A |
| 3,956,149 | 5/1976 | Coleman | 252/51.5 A |
| 3,959,159 | 5/1976 | Coleman | 252/51.5 A |
| 4,121,026 | 10/1978 | Cheng et al. | 525/379 |
| 4,180,637 | 12/1979 | Evani et al. | 526/204 |
| 4,200,720 | 4/1980 | Evani et al. | 526/233 |
| 4,284,414 | 8/1981 | Bryant | 44/62 |
| 4,511,369 | 4/1985 | Denis et al. | 525/327.6 |
| 4,594,378 | 6/1986 | Tipton et al. | 524/106 |
| 4,604,221 | 8/1986 | Bryant et al. | 252/51.5 A |

FOREIGN PATENT DOCUMENTS

| | | | |
|---|---|---|---|
| 2416117 | 10/1975 | Fed. Rep. of Germany | 525/327.6 |
| 2124633 | 2/1984 | United Kingdom | 525/327.6 |

OTHER PUBLICATIONS

Chemical Abstracts, vol. 88, No. 16, 17 Apr. 1978 (Columbus, Ohio) "Modified Alternating Copolymers", Astract No. 106208f.

Chemical Abstracts, vol. 91, No. 20, 12 Nov. 1979 (Columbus, Ohio) "Reaction of Some Amines with Anhydride Rings of Maleic Anhydride Copolymers", Abstract No. 158136n.

Primary Examiner—Ellen McAvoy
Attorney, Agent, or Firm—James L. Cordek; Frederick D. Hunter, Sr.; Joseph P. Fischer

[57] ABSTRACT

Nitrogen-containing esters of a carboxy-containing interpolymer, wherein the interpolymer has an inherent viscosity ranging from about 0.05 to 0.30 are disclosed. The esters are useful as additives in functional fluids including transmission fluids (both automatic and manual), hydraulic fluids and gear fluids. The transmission, hydraulic and gear fluids containing the esters exhibit improved shear stability while maintaining desired high and low temperature viscosity characteristics.

21 Claims, No Drawings

NITROGEN-CONTAINING ESTERS OF CARBOXY-CONTAINING INTERPOLYMERS

CROSS REFERENCE

This application is a continuation of application Ser. No. 07/187,719, filed Apr. 29, 1988, now abandoned, which is a continuation-in-part of copending application U.S. Ser. No. 122,962, filed Nov. 19, 1987, now abandoned which is herein incorporated in its entirety by reference. We claim priority under 35 USC Sec. 120 with respect to any and all disclosures made in said application U.S. Ser. No. 122,962.

TECHNICAL FIELD OF THE INVENTION

This invention relates to additives for various functional fluids including transmission fluids (i.e., automatic transmission fluids and manual transmission fluids), hydraulic fluids and gear fluids. More particularly, the invention relates to nitrogen-containing esters of a carboxy-containing interpolymer in functional fluids.

BACKGROUND OF THE INVENTION

The problems associated with the lubrication of automatic and manual transmissions and the operation of hydraulic fluid systems are well known to those skilled in the art. For example, in the lubrication of transmissions. proper fluid viscosity at both low and high temperatures is essential to successful operation. Good low temperature fluidity eases cold weather starting and insures that the hydraulic control system will properly "shift gears". High viscosity at elevated temperatures insures pumpability and the satisfactory functioning of converters, valves, clutches, gears and bearings In the operation of hydraulic fluid systems, proper fluid viscosity at both low and high temperatures is essential to successful operation. High temperature viscosity retention is beneficial in lubrication, contributes to streamline flow and reduces leakage. Good low temperature fluidity provides rapid control action, less heating loss and lower pressure drop.

These conflicting fluidity requirements call for a product that exhibits the following characteristics:
 (A) high temperature viscosity retention,
 (B) low temperature fluidity, and
 (C) shear stability.

In order to prepare lubricants having these characteristics, it has become common practice to add a variety of chemicals to the oil. For example, in order to meet the viscosity requirements, compositions have been added to the oils which are characterized by relatively small change in their viscosity with changing temperature, and they are commonly graded according to SAE standards according to the viscosities at low (e.g., 0° F) and at high temperatures (e.g., 210° F). As a result of the incorporation of such additives, the lubricating oils are often referred to as being "multi-graded". In terms of widely accepted concepts, such multi-graded lubricants have the desirable properties as being able to function immediately, though cold, upon being put into service, and to continue to function satisfactorily as they become heated during operation.

It is desirable, if not necessary, that lubricating compositions especially designed for use as transmission fluids, hydraulic fluids, and gear fluids exhibit shear stability. Shear stability means that the lubricating oils will not degrade or lose their desirable viscosity characteristics as a result of the shearing forces encountered during their use. Lubricating oil compositions exhibiting desirable shear stability will be found to generally retain their viscosity within 85–100% of the original viscosity after a number of hours, (e.g., 100 hours) of service. It has been recognized that many ordinary viscosity index improvers commonly added to crankcase lubricating oils, such as high molecular weight, polyisobutene and polyacrylates, do not possess the desired shear stability for use in improving the viscosity characteristics of transmission fluids and hydraulic fluids.

U.S. Pat. No. 3,702,300 issued to Coleman relates to lubricating compositions containing a nitrogen-containing mixed ester of a carboxy-containing interpolymer.

U.S. Pat. No. 3,933,761 issued to Coleman relates to a nitrogen-containing mixed ester of a carboxy-containing interpolymer and lubricants containing the same.

U.S. Pat. No. 3,956,149 issued to Coleman relates to a lubricant or fuel composition containing a nitrogen-containing ester of a carboxy-containing interpolymer.

U.S. Pat. No. 3,959,159 issued to Coleman relates to lubricating compositions containing a nitrogen-containing mixed ester of a carboxy-containing interpolymer.

U.S. Pat. No. 4,284,414 issued to Bryant relates to a crude oil composition containing mixed alkyl esters of a carboxy-containing interpolymer.

U.S. Pat. No. 4,604,221 issued to Bryant et al relates to a nitrogen-containing ester of a carboxy-containing interpolymer and lubricants containing the same.

U.S. Pat. No. 3,329,658 issued to Fields relates to nitrogen-containing esters of carboxy-containing copolymers with dispersancy properties.

U.S. Pat. No. 3,449,250 issued to Fields relates to nitrogen-containing ester of carboxy-containing copolymers with dispersancy properties.

U.S. Pat. No. 4,180,637 issued to Evani et al relates to a process for preparing a low molecular weight carboxy-containing copolymer.

U.S. Pat. No. 4,200,720 issued to Evani et al relates to a process for preparing a low molecular weight carboxy-containing interpolymer.

U.S. Pat. No. 3,085,994 issued to Muskat relates to a carboxy-containing interpolymer.

U.S. Pat. No. 3,388,106 issued to Muskat relates to a process for making a carboxy-containing interpolymer.

U.S. Pat. No. 3,392,155 issued to Muskat relates to a polyoxy alkylene glycol ester of a carboxy-containing interpolymer.

SUMMARY OF THE INVENTION

This invention is directed to a nitrogen-containing ester of a carboxy-containing interpolymer, having an inherent viscosity of from about 0.05 to about 0.30, of a vinyl aromatic monomer and an alpha, beta-unsaturated carboxylic acid, anhydride or ester thereof, which nitrogen-containing ester contains pendant polar groups (A) and (B) wherein:

(A) is a carboxylic ester group having at least 8 aliphatic carbon atoms in an alkyl portion of the ester radical and (B) is a carbonyl-amino group derived from an amino compound having a primary or secondary amino group.

The esters are useful as additives in various functional fluids including transmission fluids (both automatic and manual), hydraulic fluids and gear fluids. The transmission, hydraulic and gear fluids containing the esters exhibit improved shear stability while maintaining desired high and low temperature viscosity characteristics.

An object of this invention is to provide a process for producing low molecular weight carboxy-containing interpolymers.

An advantage of the invention is that functional fluids containing esters of the carboxy containing interpolymer have good low temperature properties even at relatively high interpolymer levels.

A feature of the invention is to provide esters from a mixture of alcohols which improves low temperature properties of functional fluids with relatively high interpolymer levels.

These and other objects, advantages and features of the present invention will become apparent to those persons skilled in the art upon reading the details of the structure synthesis and usage as more fully set forth below. Reference is made to the accompanying general structural formulae forming a part hereof wherein like symbols refer to like molecular moieties throughout.

Before the present nitrogen containing mixed esters and process for making such are described, it is to be understood that this invention is not limited to the particular esters or processes described as such compounds and methods, may of course, vary. It is also to be understood that the terminology used herein is for the purpose of describing particular embodiments only, and is not intended to be limiting since the scope of the present invention will be limited only by the appended claims.

It must be noted that as used in this specification and the appended claims, the singular forms "a", "an" and "the" include plural referents unless the context clearly dictates otherwise. Thus, for example, reference to "an alcohol" includes mixtures of alcohols and so forth.

DETAILED DESCRIPTION OF THE PREFERRED EMBODIMENTS

The esters of the carboxy-containing interpolymer contain within their structure at least two polar groups which are derived from the carboxy groups of said interpolymer:

(A) a carboxylic ester group having at least 8 aliphatic carbon atoms in the ester group, and (B) a carbonyl-amino group derived from an amino compound having a primary or secondary amino group wherein the molar percentage of (A):(B) is (85-99):(1-15).

In a second embodiment, the ester has within the polymer structure three pendant polar groups identified as (A) and (B) (as above) and a third group (C) which is a carboxylic ester group having no more than 7 aliphatic carbon atoms in the ester group. The molar percentage of (A):(B):(C) is (60-90):(10-30):(2-15).

In reference to the size of the ester groups, it is pointed out that an ester group is represented by the formula

C(O)(OR)

and the number of carbon atoms in an ester group is thus the carbon atoms contained in the (OR) group.

It should be noted that the linkage described as the carbonyl-amino group may be amide, imide, or amidine, and inasmuch as any such linkages are contemplated within the present invention, the term "carbonyl-amino" is adopted as being a convenient, generic expression useful for the purpose of defining the polar group B. In a particularly advantageous embodiment of the invention, the linkage is imide or predominantly imide.

Another important element of the invention is the molecular weight of the carboxy-containing interpolymer. For convenience, the molecular weight is expressed in terms of the inherent viscosity of the interpolymer which is a widely recognized means of indirectly expressing the molecular size of a polymeric substance. As used herein, the inherent viscosity is the value obtained in accordance with the formula:

$$\text{Inherent Viscosity} = \frac{\ln \text{ (relative viscosity)}}{\text{concentration}}$$

wherein the relative viscosity is measured in a dilution viscometer and is determined by dividing the flow time of a solution of the interpolymer in 100 ml. of acetone, by the flow time of acetone at 30°±0.02° C. For purpose of computation by the above formula, the concentration is the number of grams of the interpolymer per 100 ml. of acetone. The unit of inherent viscosity is then deciliter per gram (dLg$^{-1}$).

A more detailed discussion of inherent viscosity, as well as its relationship to average molecular weight, appears in Jan F. Rabek, Experimental Methods in Polymer Chemistry, (1983 Edition), pages 126, et seq. (incorporated herein by reference for purposes of describing and disclosing inherent viscosity and means for determining such).

As previously mentioned, it is desirable to maintain the lubricating composition's viscosity properties during the useful life of the fluid. The esters of the carboxy containing interpolymers of this invention impart the quality known as shear stability. The carboxy-containing interpolymer contemplated in this invention has an inherent viscosity of from about 0.05 to 0.30, preferably from about 0.10 to 0.26, more preferably about 0.10 to 0.23.

The interpolymers are copolymers, terpolymers, and other interpolymers of alpha, beta-unsaturated dicarboxylic acids or derivatives thereof, and one or more vinyl aromatic monomers having up to 12 carbon atoms. The derivatives of the dicarboxylic acid are derivatives which are polymerizable with the monoolefinic compound, and as such, may be the esters and anhydrides of the acids. Copolymers of maleic anhydride and styrene are especially suitable.

Suitable alpha, beta-unsaturated dicarboxylic acids, anhydrides or lower alkyl esters thereof useful in the preparation of the interpolymers include those wherein a carbon-to-carbon double bond is in an alpha, beta-position to at least one of the carboxy functions (e.g., itaconic acid, anhydride or lower esters thereof) and preferably, in an alpha, beta-position to both of the carboxy functions of the alpha, beta-dicarboxylic acid, anhydride or the lower alkyl ester thereof (e.g., maleic acid, anhydride or lower alkyl esters thereof). Normally, the carboxy functions of these compounds will be separated by up to 4 carbon atoms, preferably 2 carbon atoms.

A class of preferred alpha, beta-unsaturated dicarboxylic acid, anhydride or the lower alkyl esters thereof, includes those compounds corresponding to the formulae:

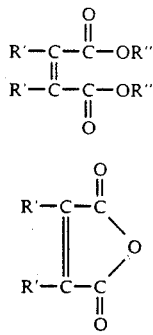

(I)

(II)

(including the geometric isomers thereof, i.e., cis and trans) wherein each R' is independently hydrogen; halogen (e.g., chloro, bromo, or iodo); hydrocarbyl or halogen-substituted hydrocarbyl of up to about 8 carbon atoms, preferably alkyl, alkaryl or aryl; (preferably, at least one R' is hydrogen); and each R" is independently hydrogen or lower alkyl of up to about 7 carbon atoms (e.g., methyl, ethyl, butyl or heptyl). These preferred alpha, beta-unsaturated dicarboxylic acids, anhydrides or alkyl esters thereof contain a total carbon content of up to about 25 carbon atoms, normally up to about 15 carbon atoms. Maleic anhydride, maleic acid and their lower alkyl esters thereof are preferred. Maleic anhydride is most preferred. Interpolymers derived from mixtures of two or more of any of these can also be used.

Suitable vinyl aromatic monomers of up to about 12 carbon atoms which can be polymerized with the alpha, beta-unsaturated dicarboxylic acids, anhydrides or lower esters thereof are well known. The vinyl aromatic compounds include styrene and substituted styrenes such as 4-methylstyrene, halostyrenes, para-tert-butyl styrenes and para-lower alkoxy styrene. Styrene is the most preferred vinyl aromatic monomer. Interpolymers derived from mixtures of two or more of any of these can also be used.

Of the interpolymers of this invention, the styrene-maleic anhydride interpolymers are especially useful. They are obtained by polymerizing styrene with maleic anhydride at molar ratios from (5:1) to (0.75:1), with (2.5:1) to (1:1) being preferred, and (1:1) being most preferred.

A preferred embodiment may be obtained by polymerizing an additional comonomer with the vinyl aromatic monomer and the alpha, beta- unsaturated dicarboxylic anhydride, acid or ester. As an example, it has been found that the addition of an interpolymerizable comonomer with styrene and maleic anhydride copolymer may form an interpolymer which may improve the lower temperature characteristics of lubricating compositions containing esters of these interpolymers. When nitrogen-containing esters of the styrene-maleic anhydride interpolymer are used at levels approaching 7% weight or more to reach the desired high temperature properties, lubricating compositions lose some desirable lower temperature properties, i.e. flow and pumpability. The interpolymerizable comonomer improves these low temperature properties. The additional comonomer may be: methacrylic acid; esters of methacrylic acid; methacrylamide; itaconic acid and anhydride; citraconic acid and anhydride; isobutylene and its oligomers; diisobutylene and methylstyrene isomers. Alpha-methylstyrene, methacrylic acid, and esters of methacrylic acid are preferred; methacrylic acid and esters of methacrylic acid are most preferred. These comonomers are present in relatively minor portions, i.e., less than about 0.3 mole, usually less than 0.15 mole, per mole of either the olefin (e.g. styrene) or the alpha, beta-unsaturated acid or anhydride (e.g. maleic anhydride). Terpolymers of styrene, maleic anhydride and esters of methacrylic acid are preferred.

The carboxy-containing interpolymers are obtained by polymerization of alpha, beta-unsaturated acids, anhydrides or esters thereof, with vinyl aromatic monomers in a suitable solvent. The temperature range for the reaction is from the melting point of the reactants to the decomposition temperature of the components, preferably from about 40° C. to about 150° C. The alpha, beta-unsaturated acid or anhydride, usually as a solution in aromatic solvent, is heated from ambient temperature to the reaction temperature. A portion of the free radical initiator is added at the reaction temperature. The remainder of the free radical initiator and the vinyl aromatic monomer are added dropwise over about 20 to about 180 minutes. A vacuum, about 30 to about 760 torr, may be used to control the reaction temperature by effecting reflux. The total time of polymerization is usually from about 1 to about 8 hours.

The solvents used in this invention provide a medium for polymerization as well as contribute to the control of molecular weight of the interpolymer by acting as a chain transfer agent, (e.g., act to terminate the propagating free radical). Examples of solvents suitable for the reaction are toluene, xylene, benzene and cumene. The preferred solvents are xylene and toluene; most preferred is toluene.

The free radical initiator should decompose to provide enough free radicals to form the interpolymers of the present invention. Polymerization conditions are chosen such that the half life of a free radical initiator is from about 0.3 to about 2 hours, with 0.5 to 1 hour preferred. An example of a suitable initiator is benzoyl peroxide, although other peroxides, peresters and azo initiators may be employed.

A feature of the invention is the addition time of the vinyl aromatic monomer. For faster addition of the monomer, the molecular weight is higher. Therefore, it is preferred that the monomer is added over about 30 to about 120 minutes, and most preferred over 45-100 minutes. A portion of the free radical initiator is added at reaction temperature immediately before addition of the aromatic monomer. This initial portion is from one-fourth to three-fourths of the total amount of initiator. Preferably, one-half of the initiator is added before the vinyl aromatic monomer addition is begun. The addition time for the remainder of the free radical initiator is usually the same as the addition time of the aromatic monomer.

The process with the interpolymerizable comonomers is essentially the same as above. The interpolymerizable comonomer may be added with the alpha, beta-unsaturated carboxylic acid, anhydrides or esters thereof or may be mixed with the vinyl aromatic monomer or free radical initiator. When the comonomer has little tendency to homopolymerize, it may be added with the alpha, beta-unsaturated carboxylic acid, anhydride or esters thereof as well as with the free radical initiator or vinyl aromatic monomer. Itaconic and citraconic acids and anhydrides are examples of comonomers of this type. Comonomers which have a tendency to homopolymerize should be added along with either the free radical initiator or the vinyl aromatic monomer.

The following examples are presented so as to provide those of ordinary skill in the art with a complete disclosure and description of how to make the compounds and compositions of the invention and are not intended to limit the scope of what the inventors regard as their invention. Efforts have been made to insure accuracy with respect to numbers used (e.g., amounts, temperature, etc.) but some experimental errors and deviation may be expected. Unless indicated otherwise, parts are parts by weight, percentages are in percentages by weight, temperature is in degrees C, and pressure is at or near atmospheric. Inherent viscosity is in deciliter per gram, usually abbreviated $dLg^{-1}$.

EXAMPLE A-1

Mix and heat 490 parts of maleic anhydride and 6900 parts of toluene to 100° C. Prepare an initiator solution by mixing 14.3 parts of 70% benzoyl peroxide and 500 parts of toluene. Add one-half of the initiator solution to the maleic anhydride and toluene at about 100° C. Charge the remainder of the initiator solution and a mixture of 494 parts of styrene, 29.5 parts of alpha-methyl styrene and 25 parts of methyl methyacrylate dropwise over 90 minutes at a constant rate. Apply a vacuum to obtain reflux at 100° C. Maintain the reaction temperature at 100° C. for 4 hours. The interpolymer obtained should have an inherent viscosity of 0.14 $dLg^{-1}$.

EXAMPLE A-2

Utilizing the same procedure as described in Example A-1, polymerize 490 parts of maleic anhydride with 520 parts of styrene and 25 parts of methyl methyacrylate. Use 11.5 parts of benzoyl peroxide along with 7400 parts of toluene. The interpolymer obtained should have an inherent viscosity of 0.13 $dLg^{-1}$.

EXAMPLE A-3

Using the same procedure as described in Example A-1, polymerize 560 parts of itaconic anhydride with 520 parts of styrene and 29.5 parts of alpha-methyl styrene. Use 8.5 parts of benzoyl peroxide as an initiator and 7400 parts of toluene as a solvent. The interpolymer obtained should have an inherent viscosity of 0.20 $dLg^{-1}$.

EXAMPLE A-4

Utilizing the same procedure as described in Example A-1, polymerize 490 parts of maleic anhydride with 520 parts of styrene and 50 parts of methyl methyacrylate. Use 8.5 parts of benzyl peroxide along with 7400 parts of toluene. The interpolymer obtained should have an inherent viscosity of 0.15 $dLg^{-1}$.

EXAMPLE A-5

Heat 560 parts of itaconic anhydride and 5000 parts of toluene to 100° C. Prepare an initiator solution by mixing 4.25 parts of benzoyl peroxide with 500 parts of toluene. One-half of the initiator solution is to be added to the itaconic anhydride and toluene solution at 100° C. Add dropwise 520 parts of styrene and the remainder of the initiator solution concurrently over 40 minutes at a constant rate. Maintain temperature at about 100° C. for 4 hours by applying a vacuum to effect reflux. The interpolymer obtained should have an inherent viscosity of 0.23 $dLg^{-1}$.

EXAMPLE A-6

Mix and heat 490 parts of maleic anhydride and 5000 parts of xylene to 100° C. Prepare an initiator solution by mixing 17 parts of 70% benzoyl peroxide with 500 parts of xylene. Add the initiator solution in one portion at 100° C. Apply a vacuum to effect reflux. At 100° C., add dropwise 520 parts of styrene over 20 minutes at a constant rate. The reaction is very exothermic. Maintain the reaction temperature at 100° C. for 4 hours after the addition is completed. The interpolymer obtained should have an inherent viscosity of 0.15 $dLg^{-1}$.

The alcohols from which the esters of this invention are prepared include the high molecular weight alcohol having at least 8 aliphatic carbon atoms, i.e., high molecular weight alcohols having from about 8 to about 40 aliphatic carbon atoms and preferably alcohols having from about 8 to 30 aliphatic carbon atoms or from about 8 to 24 aliphatic carbon atoms.

Although the esters may be prepared from one or more of the high molecular weight aliphatic alcohols, it is also advantageous to prepare a ester from mixtures or a combination of high molecular weight and low molecular weight aliphatic alcohols.

In preparing the mixed esters of the carboxy interpolymers, one or more of the low molecular weight alcohols having from 1 to 7 aliphatic carbon atoms may be used separately or in combination with the high molecular weight aliphatic alcohols. Specific examples of the low molecular weight ester groups, i.e., the R group of ester radical C(O)OR includes methyl, ethyl, propyl, butyl, pentyl, hexyl, 2-methylbutyl, 2,3-dimethylbutyl, etc. Other substituents, i.e., polar substituents, etc., which may be present in the ester radicals of the nitrogen-containing esters in amounts ranging from 0 to about 10 molar percent may include, for example, the chloro, bromo, ether, nitro, etc. and various combinations thereof. In preparing the mixed esters, the high molecular weight aliphatic alcohol may be used in an amount ranging from about 1 to about 10 moles of said high molecular weight alcohol for each 1 mole of said low molecular weight alcohol. Preferably, however, the mixed esters are prepared from alcohols wherein the high molecular weight aliphatic alcohol is present in an amount ranging from about 2 to 9 moles of said high molecular weight aliphatic alcohol and preferably from about 2.5 to 5.0 moles of said high molecular weight alcohol for each mole of said low molecular weight aliphatic alcohol.

Moreover, one or more of the high molecular weight alcohols may be reacted with the interpolymer either alone or in combination with one or more of the low molecular weight alcohols. A preferred class of alcohols includes the commercially available mixtures of alcohols. One class of commercial alcohols includes the oxoalcohols which comprise, for example, a mixture of alcohols having from about 8-24 carbon atoms. Of the various commercial alcohols, another preferred class of alcohols includes the alcohols having from about 8 to 30 aliphatic carbon atoms. These alcohol mixtures include a distribution of alcohols which vary in carbon chain length in small increments over the range disclosed. The present inventors have found that in some circumstances particularly advantageous results may be obtained by preparing the ester of the interpolymer with these commercial alcohols. The alcohols may comprise, for example, octyl alcohol, nonyl alcohol, decyl alcohol, undecyl alcohol, dodecyl alcohol, tridecyl alcohol, tetradecyl alcohol, pentadecyl alcohol, hexadecyl alcohol, octadecyl alcohol, or mixtures thereof, etc.

The esters of the invention are most conveniently prepared by first esterifying the carboxy-containing interpolymer with the higher molecular weight alcohol or a mixture of the high and low molecular weight alcohols to convert at least about 90% of the carboxy radicals of the interpolymer to ester radicals. When the mixed esters are prepared, the molar ratio of the high molecular weight alcohol to the low molecular weight alcohol used in the process should be within the range of from about 2:1 to about 9:1. In most instances the ratio will be from about 2.5:1 to about 5:1. More than one high molecular weight alcohol or low molecular weight alcohol may be used in the process. Commercial alcohol mixtures (which include statistical mixtures) such as the so-called oxo-alcohols which comprise, for example, mixtures of alcohols having 8 to about 24 carbon atoms also may be used. A particularly useful class of alcohols are the commercial alcohol mixtures or mixtures of commercial alcohol mixtures comprising octyl alcohol, nonyl alcohol, decyl alcohol, undecyl alcohol, dodecyl alcohol, tridecyl alcohol, tetradecyl alcohol, pentadecyl alcohol, hexadecyl alcohol, and octadecyl alcohol. Commercial alcohol mixtures primarily comprised of tetradecyl and pentadecyl alcohols are also particularly useful. Several suitable sources of these alcohol mixtures are the technical grade alcohols sold under the name Neodol TM (Shell Oil Company, Houston, Tex.) and under the name Alfol TM (Continental Oil Company, Ponca City, Okla.). Other alcohols useful in the process are illustrated by those which, upon esterification, yield the ester groups exemplified above.

A particularly useful mixture of alcohols is a combination of commercial alcohols. The combination is a distribution of alcohols having the range from 12 to 18 carbons (D) and a mixture of alcohols having the range from 8 to 11 carbon atoms (E). The preferred combinations include Alfol 12-18 (alcohols having from 12 to 18 carbon atoms) with Alfol 8-10 (alcohols having from 8 to 10 carbon atoms) and Neodol 25 (alcohols having from 12 to 15 carbon atoms) with Alfol 8-10. The inventors have found that the esters of the present invention with these combination of alcohols improves the low temperature properties of lubricants. The molar ratio of (D):(E) is (1-2):(1-2), with the preferred ratio of (1):(1). A useful third component to add to the above combination is an alcohol having from 2 to 5 carbon atoms (F). Butyl alcohol is preferred. The molar ratio of (D):(E):(F) is (30-75:5-65:0-50). For gear oil applications, the preferred ratio of (D):(E):(F) is (30-45:45-65:0-25), most preferably (35-40:45-60:0-20). For automatic transmission fluids, the preferred ratio of (D):(E):(F) is (40-65:5-60:0-50), more preferably (40-55:15-55:0-30).

The extent of esterification, as indicated previously, may range from about 85% to about 99% conversion of the carboxy radicals of the interpolymer to ester radicals. The preferred degree of esterification is about 95%.

The esterification can be accomplished simply by heating the carboxy-containing interpolymer and the alcohol or alcohol mixtures under conditions typical for effecting esterification. Such conditions usually include, for example, a temperature of at least about 80° C., preferably from about 120° C. to about 350° C., provided that the temperature be below the decomposition point of the reaction mixture or any component, and the removal of water of esterification as the reaction proceeds. Such conditions may optionally include the use of an excess of the alcohol reactant so as to facilitate esterification, the use of a solvent or diluent such as mineral oil, toluene, benzene, xylene or the like and an esterification catalyst such as toluene sulfonic acid, sulfuric acid, aluminum chloride, boron trifluoride-triethylamine, hydrochloric acid, ammonium sulfate, phosphoric acid, sodium methoxide, sodium acetate, methane sulfonic acid or the like. These conditions and variations thereof are well known in the art.

A particularly desirable method of effecting esterification when mixed esters are desired involves first reacting the carboxy-containing interpolymer with the relatively high molecular weight alcohol and then reacting the partially esterified interpolymer with the relatively low molecular weight alcohol. A variation of this technique involves initiating the esterification with the relatively high molecular weight alcohol and before such esterification is complete the relatively low molecular weight alcohol is introduced into the reaction mass so as to achieve a mixed esterification.

The carbonyl-amino group is derived from the reaction of a carboxy group on the interpolymer with an amino compound having a primary or secondary amino group. An example of the amino compound is represented by the formula:

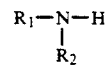

where $R_1$ is hydrogen, alkyl or hydrocarbyl and $R_2$ is alkyl. Preferably, $R_1$ is hydrogen. Examples of amino compounds are butylamine; docecylamine and octylamine. In a preferred embodiment the amino compound is a polyamino compound. The polyamino compound reacts with the carboxy-containing interpolymer to form a carbonyl-amino group.

Examples of the carbonyl-amino group include those derived from polyamino compounds having one primary or secondary amino group and at least one monofunctional amino group such as tertiary-amino or heterocyclic amino group. Such compounds may thus be tertiary-amino substituted primary or secondary amines or other substituted primary or secondary amines in which the substituent is derived from pyrroles, pyrrolidones, caprolactams, oxazolidones, oxazoles, thiazoles, pyrazoles, pyrazolines, imidazoles, imidazolines, thiazines, oxazines, diazines, oxycarbamyl, thiocarbamyl, uracils, hydantoins, thiohydantoins, guanidines, ureas, sulfonamides, phosphoramides, phenothiazines, amidines, etc. Examples of such polyamino compounds include dimethylamino-ethylamine, dibutylaminoethylamine, 3-dimethylamino-1-propylamine, 4-methylethylamino-1-butylamine, pyridylethylamine, N-morpholinoethylamine, tetrahydro-pyridylethylamine, bis-(dimethylamino)propylamine, bis-(diethylamino) ethylamine, N,N-dimethyl-p-phenylene diamine, piperidylethylamine, 1-aminoethyl pyrazole, 1-(methylamino)-pyrazoline, 1-methyl-4-aminooctyl pyrazole, 1-aminobutyl imidazole, 4-aminoethyl thiazole, 2-aminoethyl triazine, dimethylcarbamyl propylamine, N-methyl-N-aminopropyl acetamide, N-aminoethyl succinimide, N-methylamino maleimide, N-aminobutyl-alpha-chloro-succinimide, 3-aminoethyl uracil, 2-aminoethyl pyridine, ortho-aminoethyl-N-N-dimethylbenzenesulfamide, N-amino-ethyl phenothiazine, N-aminoethylacetamidine, 1-aminophenyl-2-methylimidazoline, N-methyl-N-aminoethyl-S-ethyl-dithiocarbamate, etc. Preferred polyamino compounds include the N-aminoalkyl-substituted morpholines such as N-3-aminopropyl morpholine. For the most part, the polyamino compounds are those which contain only one primary-amino or secondary-amino group and, preferably at least one tertiary-amino group. The tertiary amino group is preferably a heterocyclic amino group. In some instances, polyamino compounds may contain up to about 6 amino groups although, in most instances, they contain one primary amino group and either one or two tertiary amino groups. The polyamino compounds may be aromatic or aliphatic amines and are preferably heterocyclic amines such as amino-alkyl-substituted morpholines, piperazines, pyridines, benzopyrroles, picolines, quinolines, pyrroles, pyrrolidinones, etc. The polyamino compounds are usually alkyl amines having from 4 to about 30 carbon atoms, preferably from 4 to about 12 carbon atoms. Polar substituents may likewise be present in the polyamines.

The esterified interpolymer may then be treated with a base to neutralize the acidic catalyst. A mineral base or an amino compound may be used to neutralize the acidic catalyst. A preferred method is addition of a mineral base in an amount to neutralize the acidic catalyst. The esterified interpolymer is then treated with an amino compound. Examples of the mineral base are sodium hydroxide, calcium hydroxide and the like, with sodium hydroxide preferred. The neutralization is preferably carried out at a temperature of at least 50° C., often from about 120° C. to about 200° C., provided that the temperature does not exceed the decomposition point of the reaction mass. In most instances the neutralization temperature is between 50° C. and 150° C. A slight excess of the stoichiometric amount of the amino compound is often desirable, to insure substantial completion of neutralization.

The esterified interpolymers of the present invention may be used, in lubricants or in concentrates, by itself or in combination with any other known additive which includes, but is not limited to dispersants, detergents, antioxidants, antiwear agents, extreme pressure agents, emulsifiers, demulsifiers, friction modifiers, anti-rust agents, corrosion inhibitors, viscosity improvers, pour point depressants, dyes, and solvents to improve handleability which may include alkyl and/or aryl hydrocarbons. These additives may be present in various amounts depending on the needs of the final product.

Dispersants include but are not limited to succinimide, succinamide, ester, and Mannich dispersants as well as materials functioning both as dispersants and viscosity improvers. The dispersants listed above may be post-treated with reagents such as urea, thiourea, carbon disulfide, aldehydes, ketones, carboxylic acids, hydrocarbon substituted succinic anhydride, nitriles, epoxides, boron compounds, phosphorus compounds and the like.

Detergents include, but are not limited to Newtonian or non-Newtonian, neutral or basic salts of alkali, alkaline earth or transition metals with one or more hydrocarbyl sulfonic acid, carboxylic acid, phosphoric acid, thiophosphoric acid, dithiophosphoric acid, phosphinic acid, thiophosphinic acid, sulfur coupled phenol or phenol. Basic salts are salts that contain a stoichiometric excess of metal present per acid function.

Antioxidants, corrosion inhibitors, extreme pressure and antiwear agents include but are not limited to metal salts of a phosphorus acid, metals salts of a thiophosphorus acid or dithiophosphorus acid; organic sulfides and polysulfides; chlorinated aliphatic hydrocarbons; phosphorus esters including dihydrocarbyl and trihydrocarbyl phosphites; boron-containing compounds including borate esters; and molybdenum compounds.

Viscosity improvers include but are not limited to polyisobutenes, polymethyacrylate acid esters, polyacrylate acid esters, diene polymers, polyalkyl styrenes, alkenyl aryl conjugated diene copolymers, polyolefins and multifunctional viscosity improvers.

Pour point depressants are a particularly useful type of additive often included in the lubricating oils described herein. See for example, page 8 of "Lubricant Additives" by C. V. Smallheer and R. Kennedy Smith (Lexius-Hiles Company Publishers, Cleveland, Ohio, 1967).

Anti-foam agents used to reduce or prevent the formation of stable foam include silicones or organic polymers. Examples of these and additional anti-foam compositions are described in "Foam Control Agents", by Henry T. Kerner (Noyes Data Corporation, 1976), pages 125–162.

These and other additives are described in greater detail in U.S. Pat. No. 4,582,618 (column 14, line 52 through column 17, line 16, inclusive), herein incorporated by reference for its disclosure of other additives that may be used in combination with the present invention.

The concentrate might contain 1% to 90% by weight of the esters. The esters may be present in a final product, blend or concentrate in (in a minor amount, i.e., up to 50% by weight) any amount effective to act as a viscosity improver but is preferably present in gear oils, oil of lubricating viscosity, hydraulic oils, fuel oils or automatic transmission fluids in an amount of from about 3 to about 50%, preferably from about 3 to about 25% by weight.

The lubricating compositions and methods of this invention employ an oil of lubricating viscosity, including natural or synthetic lubricating oils and mixtures thereof. Natural oils include animal oils, vegetable oils, mineral lubricating oils, solvent or acid treated mineral oils, and oils derived from coal or shale. Synthetic lubricating oils include hydrocarbon oils, halo-substituted hydrocarbon oils, alkylene oxide polymers, esters of dicarboxylic acids and polyols, esters of phosphorus-containing acids, polymeric tetrahydrofurans and silcon-based oils.

Unrefined, refined and rerefined oils, either natural or synthetic may be used in the compositions of the present invention.

Specific examples of the oils of lubricating viscosity are described in U.S. Pat. No. 4,326,972 and European Pat. No. Publication 107,282, both herein incorporated by reference for their disclosures relating to lubricating oils. A basic, brief description of lubricant base oils appears in an article by D. V. Brock, "Lubricant Engineering", volume 43, pages 184–185, March, 1987. This article is herein incorporated by reference for its disclosures relating to lubricating oils.

A description of oils of lubricating viscosity occurs in U.S. Pat. No. 4,582,618 (column 2, line 37 through column 3, line 63, inclusive), herein incorporated by reference for its disclosure to oils of lubricating viscosity.

The following examples are described so as to provide those of ordinary skill in the art with a complete disclosure and description how to make the compounds and compositions of the invention and are not intended to limit the scope of what the inventors regard as their invention. Efforts have been made to insure accuracy with respect to numbers used (e.g., amounts, temperature, etc.) but some experimental errors and deviation should be accounted for. Unless indicated otherwise, parts are parts by weight, temperature is in degrees C, and pressure is at or near atmospheric.

EXAMPLE B-1

Charles to a suitable vessel a toluene slurry (1688 parts) having 12.32% solids and 87.68% volatiles of the interpolymer of Example A-1, Alfol 1218 (217 parts) and mineral oil (130 parts). Heat the mixture to 100° C with medium agitation under nitrogen. Add sulfuric acid (4.22 parts of a 93% solution) and Alfol 810 (101 parts) to the mixture. Heat the mixture to 150° C. by removing toluene-water distillate. Add butanol (20 parts) to the mixture. Maintain the temperature of the mixture at 150° C. for 1½ hours. Add a second portion of butanol (20 parts) to the mixture. Maintain the temperature of the mixture at 150° C. until the net acid number indicates that esterification is at least 95% complete. Add 15 parts aminopropylmorpholine and di-tert-butyl phenol (1.04 parts) to the mixture. Vacuum strip the mixture at 150° C. and 100 torr. Add a second portion of di-tert-butyl phenol (1.04 parts) along with diatomaceous earth (16 parts). Cool the mixture to 100° C. and filter through a hot funnel to yield the desired product.

EXAMPLE B-2

Esterify the interpolymer of Example A-2 utilizing the procedure described in Example B-1. Use 257 parts of Alfol 1218, 45.2 parts of Alfol 810, 134 parts of a mineral oil, 54 parts butanol, 15 parts of aminopropylmorpholine, 2.08 parts of di-tert-butyl phenol and 16 parts of diatomaceous earth. Replace the sulfuric acid of Example B-1 with 5.46 parts of a 70% solution of methyl sulfonic acid.

EXAMPLE B-3

Esterify 208 parts of the interpolymer of Example A-6 by the same procedure as Example B-1. Use 223 parts of Neodol 25, 111 parts of Alfol 810, 222 parts of mineral oil, 4.22 parts of a 93% sulfuric acid solution, 41 parts of butanol, 15 parts of aminopropylmorpholine, 2.22 parts of di-tert-butyl phenol and 15 parts of diatomaceous earth.

EXAMPLE B-4

Esterify 212 parts of the interpolymer of Example A-4 according to the procedure as described in Example B-1, except use 5.46 parts of a 70% solution of methyl sulfonic acid in place of sulfuric acid. Use 278 parts of Alfol 1218, 49 parts of Alfol 810, 136 parts of a mineral oil, 54 parts of butanol, 15 parts of aminopropylmorpholine, 2.08 parts of di-tert-butyl phenol and 16 parts of diatomaceous earth.

EXAMPLE B-5

Charge a vessel with a toluene slurry (1303 parts) of the interpolymer of Example A-5 having 15.5% solids and 84.5% volatiles, and Alfol 1218 (200 parts). Heat the mixture to 100° C. under nitrogen with medium agitation. Add sulfuric acid (3.1 parts of a 96% solution in water) and 146 parts of Alfol 810 to the vessel. Raise the temperature of the mixture to 145° C.–150° C. while removing toluene-water distillate. Add 301 parts of a mineral oil 150° C., and maintain the temperature of the mixture at 145° C.–150° C. until the net acid number indicates that the esterification is at least 95% complete. Add 15 parts aminopropylmorpholine to the mixture, and add 1.36 parts of Ethyl Antioxidant 733 (a product of Ethyl Corporation) to the mixture. Vacuum strip the mixture at 155° C. and 5 torr. Add diatomaceous earth (10 parts) to the mixture along with Ethyl Antioxidant 733 (1.36 parts). Cool the mixture to 100° C. and filter through a heated funnel to yield the desired product.

EXAMPLE B-6

Charge to a suitable vessel the interpolymer of Example A-6 (404 parts) and Alfol 1218 (555 parts). Heat the mixture to 100° C. with agitation under nitrogen. Add Alfol 810 (98 parts) and 70% methanesulfonic acid (6.4 parts) to the mixture. Raise the temperature to 150° C. by removal of water-xylene distillate. Maintain the temperature of the mixture at 150° C. until net acid number indicates that esterification is at least 75% complete. Add butanol (104 parts) dropwise to the mixture. Maintain the temperature of the mixture at 150° C. until the net acid number indicates that esterification is at least 95% complete. Add Ethyl Antioxidant 733 (4.6 parts) and 30 parts aminopropylmorpholine to the mixture. Vacuum strip the mixture at 150° C. and 20 torr. Cool the mixture to 100° C. and add Ethyl Antioxidant 733 (4.6 parts) and diatomaceous earth (36 parts) to the mixture. Filter the mixture through a heated funnel to yield the desired product.

The present invention is shown and described herein in what is considered to be the most practical, and the preferred, embodiments. It is recognized, however, that departures may be made therefrom which are within the scope of the invention, and that obvious modifications will occur to one skilled in the art upon reading this disclosure.

What is claimed is:

1. A nitrogen-containing ester of a carboxy-containing interpolymer, wherein the carboxy-containing interpolymer is a terpolymer having an inherent viscosity of from about 0.05 to about 0.30, of a vinyl aromatic monomer, an alpha, beta-unsaturated carboxylic acid, anhydride or ester thereof in molar proportions of about 5–0.75:1 and an alpha-methylstyrene interpolymerizable comonomer at from about 0.15–0.3 moles of interpolymerizable comonomer per mole of alpha, beta-unsaturated acid, which nitrogen-containing ester contains pendant polar groups (A) and (B) wherein:
   (A) is a carboxylic ester group having at least 8 aliphatic carbon atoms in an alkyl portion of the ester radical and
   (B) is a carbonyl-amino group derived from an amino compound having a primary or secondary amino group.

2. The nitrogen-containing ester of claim 1, wherein said carboxy-containing interpolymer has an inherent viscosity from about 0.10 to about 0.26.

3. The nitrogen-containing ester of claim 1, wherein the carboxylic ester group has from about 8 to about 40 aliphatic carbon atoms.

4. The nitrogen-containing ester of claim 1, further containing a polar pendant group (C) wherein:
   (C) is a carboxylic ester group having no more than 7 aliphatic carbon atoms in the ester group.

5. The nitrogen-containing ester of claim 1, wherein the vinyl aromatic monomer is styrene.

6. The nitrogen-containing ester of claim 1, wherein the alpha, beta-unsaturated dicarboxylic anhydride is maleic anhydride.

7. The nitrogen-containing ester of claim 1, wherein the carboxylic ester group (A) is derived from a mixture of:
(D) alcohols having from 12 to 18 carbon atoms, and
(E) alcohols having from 8 to 11 carbon atoms.

8. The nitrogen-containing ester of claim 4, wherein the carboxylic ester groups are derived from a mixture of:
(D) alcohols having from 12 to 18 carbon atoms;
(E) alcohols having from 8 to 11 carbon atoms; and
(F) alcohols having from 2 to 5 carbon atoms.

9. The nitrogen-containing ester of claim 1, wherein the amino compound comprises aminopropylmorpholine.

10. A nitrogen-containing ester of a carboxy-containing interpolymer, wherein the carboxy-containing interpolymer is a terpolymer having an inherent viscosity of from about 0.10 to about 0.25, of styrene, and maleic anhydride in molar proportions of about 5-0.75:1 and an alpha-methylstyrene interpolymerizable comonomer at from about 0.15-0.3 moles of interpolymerizable comonomer per mole of alpha, beta-unsaturated acid, which nitrogen-containing ester contains pendant polar groups (A) and (B) wherein:
(A) is a carboxylic ester group having at least 8 aliphatic carbon atoms in an alkyl portion of the ester radical and
(B) is a carbonyl-amino group derived from an amino compound having a primary or secondary amino group.

11. The nitrogen-containing ester as claimed in claim 10, further containing a polar pendant group (C) wherein:
(C) is a carboxylic ester group having no more than 7 aliphatic carbon atoms in the ester group.

12. The nitrogen-containing ester as claimed in claim 10, wherein the carboxylic ester group (A) is derived from a mixture of:
(D) alcohols having from 12 to 18 carbon atoms, and
(E) alcohols having from 8 to 11 carbon atoms.

13. The nitrogen-containing ester as claimed in claim 11, wherein the carboxylic ester groups (A) and (C) are derived from a mixture of:
(D) alcohols having from 12 to 18 carbon atoms;
(E) alcohols having from 8 to 11 carbon atoms; and
(F) alcohols having from 2 to 5 carbon atoms.

14. The nitrogen-containing ester as claimed in claim 10, wherein the carbonyl-amino group is derived from aminopropyl morpholine.

15. A process for preparing a nitrogen-containing ester of a carboxy-containing interpolymer comprising the steps of:
(A) adding maleic anhydride and a free radical initiator to a suitable vessel;
(B) adding a vinyl aromatic monomer wherein the vinyl aromatic monomer and maleic anhydride are in molar proportions of about 5-0.75:1 and alpha-methylstyrene interpolymerizable comonomer at from about 0.15-0.3 moles of interpolymerizable comonomer per mole of maleic anhydride along with a free radical initiator to the maleic anhydride at rates effective to form an interpolymer having an inherent viscosity from about 0.05 to about 0.30;
(C) esterifying the interpolymer with an alcohol having at least 8 aliphatic carbon atoms; and
(D) condensing the partially esterified interpolymer with an amino compound having a primary or secondary amino group.

16. The process as claimed in claim 15, wherein the esterifying of step (C) further utilizes an alcohol having no more than 7 carbons, along with the alcohol having at least 8 aliphatic carbon atoms.

17. The process as claimed in claim 15, wherein in the esterification step (C), the alcohol having at least 8 aliphatic carbon atoms comprises a mixture of:
(D) alcohols having from 12 to 18 carbon atoms; and
(E) alcohols having from 8 to 11 carbon atoms.

18. The process as claimed in claim 16, wherein the alcohol having no more than 7 aliphatic carbon atoms comprises a mixture of alcohols having from 2 to 5 carbon atoms.

19. The process as claimed in claim 16, wherein the rates in the addition step (B) are set such that the addition is complete in about 30 to about 120 minutes.

20. The process as claimed in claim 19, wherein the addition time is from about 45 to about 100 minutes.

21. An ester prepared by the process as claimed in claim 15.

* * * * *